US011326740B2

(12) United States Patent
Yamaguchi et al.

(10) Patent No.: US 11,326,740 B2
(45) Date of Patent: May 10, 2022

(54) GAS FILLING METHOD

(71) Applicant: HONDA MOTOR CO., LTD., Tokyo (JP)

(72) Inventors: Shigehiro Yamaguchi, Wako (JP); Yuzo Fujita, Wako (JP); Kiyoshi Handa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 643 days.

(21) Appl. No.: 16/370,061

(22) Filed: Mar. 29, 2019

(65) Prior Publication Data
US 2019/0301678 A1  Oct. 3, 2019

(30) Foreign Application Priority Data

Mar. 30, 2018  (JP) .............................. JP2018-069351

(51) Int. Cl.
*F17C 5/06* (2006.01)
*F17C 13/02* (2006.01)
*G01F 17/00* (2006.01)

(52) U.S. Cl.
CPC .............. *F17C 5/06* (2013.01); *F17C 13/025* (2013.01); *F17C 13/028* (2013.01); *G01F 17/00* (2013.01);
(Continued)

(58) Field of Classification Search
CPC ........ F17C 5/06; F17C 13/025; F17C 13/028; F17C 2250/043; F17C 2250/0443;
(Continued)

(56) References Cited

U.S. PATENT DOCUMENTS 6,691,061 B1 * 2/2004 Rogers ................ G01F 23/0069
702/156
7,177,780 B2 * 2/2007 Hillam ................. B67D 7/3209
702/156
(Continued)

FOREIGN PATENT DOCUMENTS

EP         2696127 A1   2/2014
JP     2011-226558 A   11/2011
(Continued)

OTHER PUBLICATIONS

Japanese Office Action for Japanese Application No. 2018-069351, dated Jan. 14, 2020.
(Continued)

*Primary Examiner* — Timothy L Maust
*Assistant Examiner* — James R Hakomaki
(74) *Attorney, Agent, or Firm* — Birch, Stewart, Kolasch & Birch, LLP (57) ABSTRACT

To provide a gas filling method in which it is possible to estimate a volume of a tank with high accuracy even when the tank has a small volume. A hydrogen filling system includes a hydrogen station having a pressure accumulator of compressed hydrogen gas, a vehicle having a hydrogen tank, a connection tube system that connects the accumulator and the tank, and a flow rate sensor and a station pressure sensor provided on the connection tube system. A hydrogen gas filling method is a method of filling the tank with the hydrogen gas from the pressure accumulator and includes estimating a volume of the hydrogen tank based on detection values of the flow rate sensor and the station pressure sensor and a volume value of the connection tube system, after a start of filling of the hydrogen tank with the hydrogen gas from the pressure accumulator.

20 Claims, 6 Drawing Sheets

(52) U.S. Cl.
CPC .................. *F17C 2221/012* (2013.01); *F17C 2223/0123* (2013.01); *F17C 2223/036* (2013.01); *F17C 2225/0123* (2013.01); *F17C 2225/036* (2013.01); *F17C 2250/03* (2013.01); *F17C 2250/034* (2013.01); *F17C 2250/043* (2013.01); *F17C 2250/0426* (2013.01); *F17C 2250/0434* (2013.01); *F17C 2250/0439* (2013.01); *F17C 2250/0443* (2013.01); *F17C 2250/0495* (2013.01); *F17C 2250/0621* (2013.01); *F17C 2250/0636* (2013.01); *F17C 2250/0694* (2013.01); *F17C 2260/024* (2013.01); *F17C 2260/026* (2013.01); *F17C 2265/065* (2013.01); *F17C 2270/0139* (2013.01); *F17C 2270/0168* (2013.01); *F17C 2270/0763* (2013.01)

(58) Field of Classification Search
CPC ........ F17C 2250/0621; F17C 2260/026; F17C 2223/0123; F17C 2223/036; F17C 2225/0123; F17C 2225/036; F17C 2250/03; F17C 2250/034; F17C 2250/0426; F17C 2250/0434; F17C 2250/0439; F17C 2250/0495; F17C 2250/0636; F17C 2250/0694; F17C 2260/024; F17C 2265/065; F17C 2270/0139; F17C 2270/0168; F17C 2270/0763; F17C 13/00; F17C 13/02; G01F 17/00; Y02E 60/32

USPC ........................................................ 702/156
See application file for complete search history.

(56) References Cited

U.S. PATENT DOCUMENTS

| | | | |
|---|---|---|---|
| 7,248,993 B2* | 7/2007 | Cheng .................. | F17C 11/005 |
| | | | 702/156 |
| 2011/0022337 A1 | 1/2011 | Macron et al. | |
| 2014/0158250 A1* | 6/2014 | Downie .................. | C09K 3/30 |
| | | | 141/4 |
| 2015/0300863 A1* | 10/2015 | Stering .................. | G01F 17/00 |
| | | | 73/37 |
| 2015/0377416 A1* | 12/2015 | Miyoshi ............... | G05D 7/0635 |
| | | | 141/95 |
| 2016/0169449 A1* | 6/2016 | Allidieres ............... | F17C 5/007 |
| | | | 141/4 |
| 2017/0074456 A1* | 3/2017 | Handa ...................... | F17C 5/06 |

FOREIGN PATENT DOCUMENTS

| | | |
|---|---|---|
| JP | 2015-169262 A | 9/2015 |
| WO | WO 2017/159314 A1 | 9/2017 |

OTHER PUBLICATIONS

Extended European Search Report for European Application No. 19165770.9, dated Sep. 6, 2019.

* cited by examiner

GAS FILLING METHOD

This application is based on and claims the benefit of priority from Japanese Patent Application No. 2018-069351, filed on 30 Mar. 2018, the content of which is incorporated herein by reference.

BACKGROUND OF THE INVENTION

Field of the Invention

The present invention relates to a gas filling method. To be more particular, the invention relates to a gas filling method of filling a tank of a moving object, in which a supply source of a compressed gas and the tank mounted on the moving object are connected via a tube system.

Related Art

In a fuel cell vehicle, oxygenated air and hydrogen gas which is a fuel gas are supplied to a fuel cell, thereby, generating power, and an electric motor is driven by using the power. In this manner, the fuel cell vehicle runs. In recent years, the fuel cell vehicle using the fuel cell as an energy source for generating power is promoted to a practical use. It is necessary to use hydrogen gas in order to generate power with the fuel cell; in recent years, the fuel cell vehicle, in which a sufficient amount of hydrogen gas is stored in a hydrogen tank having a high-pressure tank or a storage alloy in advance, and the hydrogen gas in the tank is used for running is in a process of going mainstream. In addition, in accordance with this, studies on a filling technology of rapidly filling the tank with hydrogen gas as much as possible in a hydrogen station are actively progressed.

In addition, in order to rapidly fill the tank with hydrogen gas, it is necessary to acquire information on the tank as rapid as possible by the hydrogen station side. Therefore, a step of filling the tank with the hydrogen gas in the hydrogen station is divided into an initial filling step of tentatively filling the tank with gas in order to acquire information of the hydrogen tank and a main filling step of filling the tank with gas so as to set a target pressure increase ratio by using the information acquired in the initial filling step and realize the target pressure increase ratio.

In addition, a tank volume is one item of the information of the tank, which needs to be acquired by the hydrogen station side. In addition, a specific device that acquires the volume of the tank includes 1. estimating by using an infrared communication signal (IR communication signal) that is transmitted from a vehicle side and 2. estimating by filling the tank with a small amount of gas in the initial filling step. Incidentally, in a case where it is not possible to acquire the volume, the filling is performed at a slowest filling rate. In addition, a specific example of 2. is described in PCT International Publication No. WO2017/159314 by the applicant of the present application. In a method disclosed in Patent Document 2, a tank volume is estimated by a simultaneous gas equation which is established at two different time points. Hence, in a case where the tank volume is estimated by the method, estimation accuracy of the volume improves as an amount of hydrogen gas, with which filling is performed in the initial filling step, increases.

SUMMARY OF THE INVENTION

Besides, in recent years, the fuel cell vehicles are further widely used, and thereby development of a large-sized fuel cell vehicle such as a bus or a small-sized fuel cell vehicle such as a two-wheel vehicle is also progressed. A tank used in the large-sized or small-sized fuel cell vehicle is assumed to have a volume that is larger or smaller than a range of 2.0 to 10.0 kg that is set for a fuel cell vehicle assumed to be a general automobile in the related art. Incidentally, hereinafter, a tank having a volume within the range of 2.0 to 10.0 kg is referred to as a regular-sized tank, a tank having a volume larger than 10.0 kg is referred to as a large-sized tank, and a tank having a volume smaller than 2.0 kg is referred to as a small-sized tank.

However, in a case where the volume of the large-sized tank is estimated by using an estimation method of the related art, an amount of hydrogen gas filling is insufficient, and thus pressure changes little. As a result, there is a concern that estimation accuracy is degraded. In addition, in a case where the volume of the small-sized tank is estimated by using an estimation method of the related art, an amount of hydrogen gas filling is too much, and thus there is a concern that a temperature increases too high and filling is performed with too much amount before the tank volume is estimated.

An object of the invention is to provide a gas filling method in which it is possible to estimate a volume of a tank having various sizes with high accuracy.

(1) A gas filling system includes a gas supply device having a supply source of a compressed gas, a moving object having a tank that contains the gas, a tube system that connects the supply source and the tank, and a flow rate sensor and a pressure sensor provided on the tube system. A gas filling method according to the invention is a method of filling the tank with the gas from the supply source by the gas filling system and includes a volume estimating step of estimating a tank volume, which is a volume of the tank, based on detection values of the flow rate sensor and the pressure sensor and a volume value of the tube system, after a start of filling of the tank with the gas from the supply source.

(2) In this case, it is preferable that the gas filling method further includes a coefficient calculating step of calculating a value of a coefficient related to a pressure loss, which occurs when the gas flows in the tube system, based on the detection values of the flow rate sensor and the pressure sensor when the filling of the tank with the gas from the supply source is stopped, in which, in the volume estimating step, the tank volume is estimated based on the detection values of the flow rate sensor and the pressure sensor, the volume value of the tube system, and a pressure loss value calculated based on the value of the coefficient.

(3) In this case, it is preferable that a step of filling the tank with the gas is divided into an initial filling step of filling the tank with the gas in order to know a state of the tank and a main filling step of filling the tank with the gas so as to realize a predetermined target pressure increase ratio, in which, in the volume estimating step, the tank volume is estimated based on the detection values of the flow rate sensor and the pressure sensor, during the main filling step.

(4) In this case, it is preferable that the gas filling method further includes an initial pressure estimating step of estimating an initial pressure of the tank before a start of the initial filling step, based on the detection value of the pressure sensor, after the initial filling step is started, in which, in the main filling step, the filling of the gas is started immediately after the initial pressure estimating step is ended, and the filling of the gas is performed so as to realize a target pressure increase ratio set based on an estimation value of the initial pressure calculated in the initial pressure estimating step.

(5) In this case, it is preferable that, when an estimation value of the tank volume calculated in the volume estimating step is out of a predetermined range, the filling of the tank with the gas from the supply source is stopped.

(6) In this case, it is preferable that the gas filling system includes an input device that receives an operation performed by a user to designate a type of tank, in which the gas filling method further includes a determining step of determining whether or not a type of tank designated via the input device is a small-sized tank having a volume smaller than a predetermined standard volume or a large-sized tank having a volume larger than the standard volume and, in the main filling step, a period of filling time corresponding to a period of time from a predetermined filling start time point to a scheduled filling end time point, is calculated based on the detection values of the pressure sensor and the flow rate sensor during the filling with the gas, the target pressure increase ratio is determined such that the tank is fully filled at the scheduled filling end time point based on the period of filling time, and the filling start time point is set to a start time point of the initial filling step when a type of tank is determined as a small-sized tank in the determining step.

(7) In this case, it is preferable that, in the volume estimating step, an estimation value V' of the tank volume is calculated based on Equation (1) to be described below.

$$V' = \left[ \frac{(\Delta M + \rho_0 V_{tube}) z_1 R \, T_1}{P1} - V_{tube} \right] / \left[ 1 - \frac{\rho_0 z_1 R \, T_1}{P1} \right] \quad (1)$$

In Equation (1), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

(1) In the invention, the tank volume is estimated, based on the detection values of the flow rate sensor and the pressure sensor provided on the tube system, which connects the supply source and the tank, and the volume value of the tube system, after the start of the filling of the tank with the gas from the supply source. A part of the gas flowing from the supply source does not fill the tank but remains in the tube system. Hence, in the invention, the tank volume is estimated by using the volume value of the tube system. In this manner, of the gas flowing out of the supply source, it is possible to consider an amount of gas that does not fill the tank but remains in the tube system, and thus it is possible to estimate the tank volume with high accuracy. Incidentally, in a case where the tank has a small volume, a proportion of the volume of the tube system to the volume of the tank increases. Hence, the invention is particularly suitable for estimating the volume of the tank having the small volume with high accuracy.

(2) On the moving object, a communication device that transmits information of a tank volume, a temperature or a pressure in the tank, or the like to the gas supply device side is mounted in many cases. However, filling control that is performed in the gas supply device is basically performed, based on a sensor that performs detection with relatively high accuracy and is mounted on the gas supply device. However, in a case obtaining the detection value of the pressure sensor that is mounted on the gas supply device side is obtained, the pressure loss occurs in the tube system when the gas flows in the tube system during the filling. Therefore, the detection value of the pressure sensor on the gas supply device side indicates a value higher than an actual pressure in the tank of the moving object by an amount corresponding to the pressure loss. As a result, an error is caused to occur in the estimation of the volume. By comparison, in the invention, the value of the coefficient related to the pressure loss, which occurs when the gas flows in the tube system during the filling, is calculated based on the detection values of the flow rate sensor and the pressure sensor when the filling of the tank with the gas from the supply source is stopped, in which, when the volume is estimated, the tank volume is estimated based on the detection values of the flow rate sensor and the pressure sensor, the volume value of the tube system, and the pressure loss value calculated based on the value of the coefficient. Hence, according to the invention, it is possible to estimate the pressure in the tank based on the detection value of the pressure sensor provided on the tube system and the pressure loss value in the tube system, and thus it is possible to estimate the tank volume with high accuracy without interruption to the filling in order to estimate the volume.

(3) In the invention, when the step of filling the tank with the gas is divided into the initial filling step of filling the tank with the gas in order to know the state of the tank and the main filling step of filling the tank with the gas so as to realize a target filling ratio, the tank volume is estimated in the volume estimating step, based on the detection values of the flow rate sensor and the pressure sensor, during the main filling step. Consequently, in the invention, it is possible to estimate the tank volume based on the detection values of the flow rate sensor and the pressure sensor while the filling is performed such that the known target pressure increase ratio is realized, and thereby it is possible to further improve estimation accuracy. In other words, a so-called "a fixed-time period filling method" is derived from a so-called "fixed-quantity filling method" of filling a tank with a certain amount of gas set in advance estimating a volume of the tank in the related art. The fixed-time period filling method is a method of filling the tank for a certain period of time in a main filling step of filling the tank with a gas at a flow rate suitable for the tank and estimating the volume of the tank. In this manner, in a state in which the connected tanks are filled with amounts of gases, which are suitable for the respective volumes of the tanks, it is possible to estimate the tank volume, and thus it is possible to obtain the same estimation information on all sizes of tanks, regardless of a large size, a regular size, or a small size.

(4) In the invention, in the initial pressure estimating step, immediately after the initial pressure of the tank before the start of the initial filling step is estimated, the main filling step is started. In addition, in the main filling step, the gas is filled to realize the target pressure increase ratio set based on the estimation value of the initial pressure calculated in the initial pressure estimating step.

(5) In the invention, when the calculated estimation value of the tank volume is out of the predetermined range, the filling of the tank with the gas from the supply source is stopped. Consequently, a state of not selecting a filling mode suitable for a tank to be filled or a filling map is detected, and the filling is likely to be continuously performed even at an erroneous target pressure increase ratio. In this manner, it is possible to avoid having a temperature reaching a too high temperature.

(6) In the invention, in the main filling step, the period of filling time corresponding to the period of time from the predetermined filling start time point to the scheduled filling end time point is calculated, based on the detection values of the pressure sensor and the flow rate sensor during the filling with the gas, and the target pressure increase ratio is determined such that the tank is fully filled at the scheduled filling end time point based on the period of filling time. In addition, in a case where the user designates the type of tank to the small-sized tank, in the main filling step, the filling start time point which is a reference point of the main filling step is set to the start time point of the initial filling step. Consequently, it is possible to perform the main filling step with consideration for the amount of gas that tentatively fills the tank in the initial filling step, and thereby it is possible to fully fill the tank with accuracy without reaching over-filling of the tank having the small volume.

(7) In the invention, the tank volume is estimated based on Equation (1) described above, and thereby it is possible to estimate the tank volume with high accuracy.

DETAILED DESCRIPTION OF THE INVENTION

Figure 1:
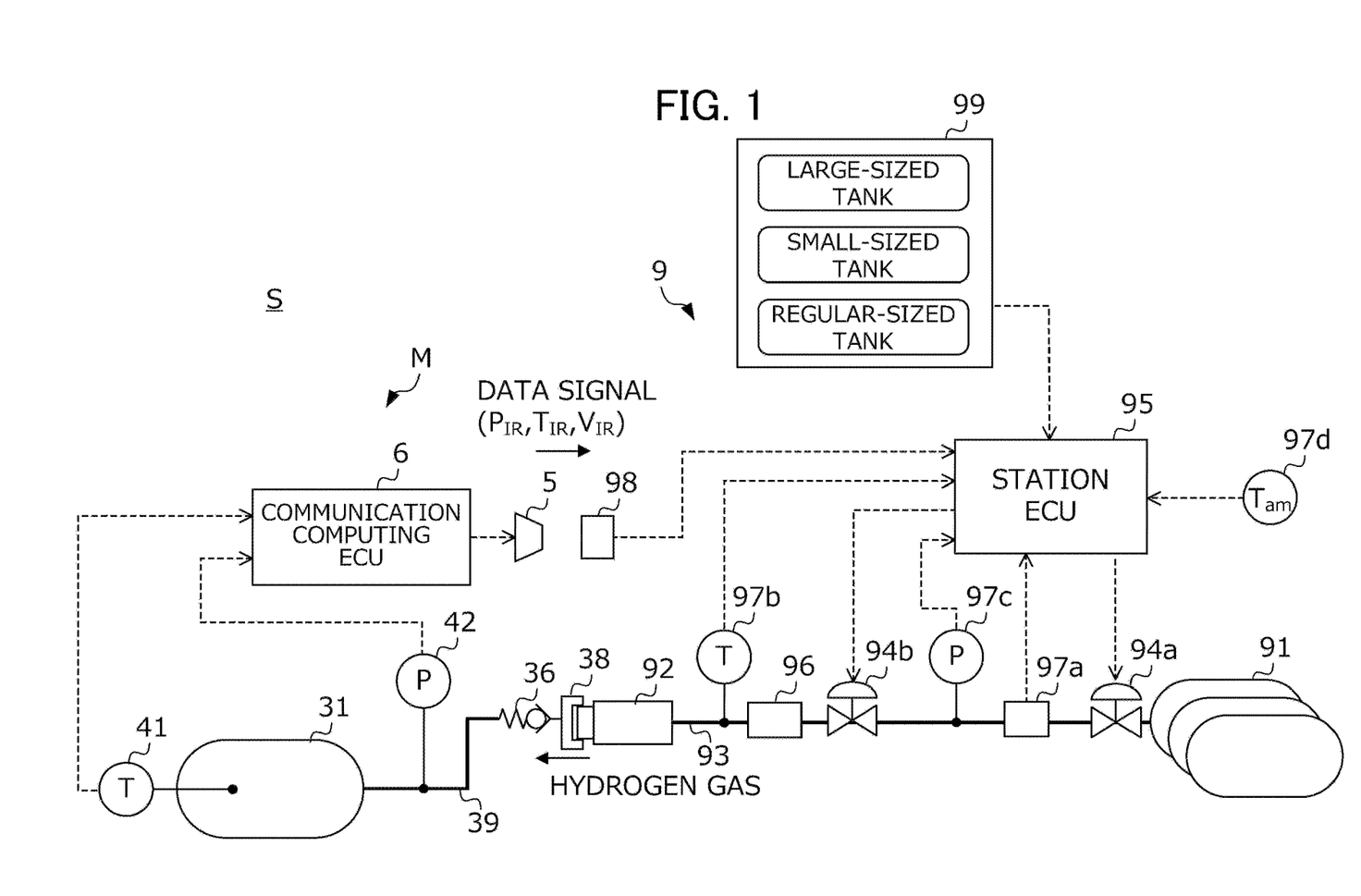
FIG. 1 is a diagram illustrating a configuration of a hydrogen filling system to which a hydrogen gas filling method according to an embodiment of the invention is applied.

Hereinafter, an embodiment of the invention will be described with reference to the drawings. FIG. 1 is a diagram illustrating a configuration of a hydrogen filling system S to which a hydrogen gas filling method according to the embodiment is applied. The hydrogen filling system S is configured of a combination of a hydrogen station 9 having a supply source of compressed hydrogen gas and a fuel cell vehicle M (hereinafter, simply referred to as a "vehicle M") having a hydrogen tank that contains the hydrogen gas supplied from the hydrogen station 9. A hydrogen gas filling method according to the embodiment is a method of filling the tank of the vehicle M with hydrogen gas from the hydrogen station 9 and is realized by the hydrogen filling system S. Hereinafter, a configuration on the vehicle M side will be first described, and then a configuration of the hydrogen station 9 side will be described.

The vehicle M is a fuel cell motorcycle that includes a tank which accumulates hydrogen gas and a fuel cell system (not illustrated) which generates electric power by using, as fuel gas, air and hydrogen gas accumulated in the tank, and that runs by driving a motor with the electric power generated by the fuel cell system. Hereinafter, a case where the vehicle M is the fuel cell motorcycle will be described; however, the invention is not limited thereto. The invention can be applied to any moving object, as long as the moving object includes a tank that accumulates hydrogen gas.

The vehicle M includes a hydrogen tank 31 that stores hydrogen gas supplied from the hydrogen station 9, a vehicle tube system 39 that is extended from the hydrogen tank 31, a fuel cell system (not illustrated) that generates electric power by using the hydrogen gas stored in the hydrogen tank 31 and runs by using the generated electric power, an infrared communication device 5 that transmits a data signal related to the hydrogen tank 31 to the hydrogen station 9, and a communication computing ECU 6 that generates the data signal that is transmitted from the infrared communication device 5. Hereinafter, as the vehicle M, a vehicle including the infrared communication device 5 and the communication computing ECU 6 will be described; however, the invention is not limited thereto. The invention can also be applied to the vehicle M that does not include the infrared communication device 5 and the communication computing ECU 6.

The vehicle tube system 39 includes a receptacle 38 in which a filling nozzle 92 to be described below of the hydrogen station 9 is fitted and a check valve 36 that is provided in the vicinity of the receptacle 38 of the vehicle tube system 39 and prevents hydrogen gas from flowing back to the receptacle 38 from the hydrogen tank 31 side.

An intra-tank temperature sensor 41 and an intra-tank pressure sensor 42, as devices that acquire information on the hydrogen tank 31 described above, are connected to the communication computing ECU 6. The intra-tank temperature sensor 41 detects a temperature of the hydrogen gas in the hydrogen tank 31 and transmits a signal associated with a detection value to the communication computing ECU 6. The intra-tank pressure sensor 42 detects a pressure in the hydrogen tank 31 and transmits a signal associated with a detection value to the communication computing ECU 6.

The communication computing ECU 6 is a microcomputer that is configured of an interface that performs A/D conversion of a detection signal of the sensor 41 or 42 described above, a CPU that performs a signal generating process to be described below, a drive circuit that drives the infrared communication device 5 in a condition determined under the process described above, a storage device that stores various items of data, or the like.

A program related to execution of a data signal generating process to be described below or unique information including a volume value of the hydrogen tank 31, which has been mounted when the vehicle M is manufactured, is recorded in the storage device of the communication computing ECU 6. Incidentally, the unique information includes information on the hydrogen tank 31, which can be identified when manufacturing is performed, such as a volume that is derived from the volume value by the known conversion law, a material of the hydrogen tank, or the like, for example, in addition to the volume value of the hydrogen tank.

For example, a CPU of the communication computing ECU 6 is triggered to start the signal generating process of generating a signal that is transmitted to the hydrogen station 9 from the infrared communication device 5, when a fuel lid that protects the receptacle 38 is opened. In addition, the CPU of the communication computing ECU 6 is triggered to end the signal generating process, when the nozzle described above is detached from the receptacle 38, and thereby it is not possible to fill the tank with hydrogen gas.

In the signal generating process, a temperature transmission value $T_{IR}$ corresponding to a current value of a temperature in the hydrogen tank, a pressure transmission value $P_{IR}$ corresponding to a current value of a pressure in the hydrogen tank, and a volume transmission value $V_{IR}$ corresponding to a current value of a volume in the hydrogen tank are acquired for each predetermined cycle, and a data signal depending on the values ($T_{IR}$, $P_{IR}$, and $V_{IR}$) is generated. As the temperature transmission value $T_{IR}$, a detection value of the intra-tank temperature sensor 41 at that time is used. As the pressure transmission value $P_{IR}$, a detection value of the intra-tank pressure sensor 42 at that time is used. In addition, as the volume transmission value $V_{IR}$, a value stored in the above-described storage device is used.

The drive circuit of the communication computing ECU 6 drives (causes flickering of) the infrared communication device 5 in response to an abort signal and the data signal generated by the signal generating process described above. Consequently, the data signal including state information (that is, the temperature transmission value $T_{IR}$, the pressure transmission value $P_{IR}$, and the like) and the unique information (that is, the volume transmission value $V_{IR}$ and the like) related to a state in the hydrogen tank is transmitted to the hydrogen station 9.

The hydrogen station 9 includes a pressure accumulator 91 in which high-pressure hydrogen gas to be supplied to the vehicle M is stored, a station tube system 93 reaching the filling nozzle 92 through which hydrogen gas is ejected from the pressure accumulator 91, a shut-off valve 94a and a flow rate control valve 94b which are provided on the station tube system 93, a station ECU 95 that controls the valves 94a and 94b, and an operation panel 99 that can be operated by a user of the hydrogen station 9 (for example, a driver of the vehicle M).

After the filling nozzle 92 is connected to the receptacle 38 provided in the vehicle M, the station ECU 95 opens and closes the shut-off valve 94a and the flow rate control valve 94b in accordance with a procedure to be described below with reference to FIGS. 2 to 5 and fills the hydrogen tank 31 of the vehicle M with the high-pressure hydrogen gas stored in the pressure accumulator 91.

In the hydrogen filling system S, when the filling nozzle 92 is connected to the receptacle 38, an integral tube system is formed by the station tube system 93 which is a component that configures the hydrogen station 9 and the vehicle tube system 39 which is a component that configures the vehicle M. The hydrogen tank 31 that is mounted on the vehicle M is connected with the pressure accumulator 91 via the tube system.

Between the flow rate control valve 94b and the filling nozzle 92 of the station tube system 93, a pre-cooler 96 that cools hydrogen gas is provided. The pre-cooler 96 cools hydrogen gas at a position close to a position at which the hydrogen tank 31 is filled, and thereby an increase in temperature of hydrogen gas in the hydrogen tank 31 is limited. Furthermore, it is possible to perform rapid filling.

In order to know a state of hydrogen gas at the position close to the position at which the hydrogen tank 31 is filled, various sensors 97a, 97b, 97c, and 97d are connected to the station ECU 95.

The flow rate sensor 97a is provided between the shut-off valve 94a and the flow rate control valve 94b of the station tube system 93 and transmits a signal associated with a mass of hydrogen gas flowing in the station tube system 93 per unit time, that is, a mass flow rate, to the station ECU 95.

The station temperature sensor 97b is provided downstream of the pre-cooler 96 on the station tube system 93 and transmits a signal associated with a temperature of hydrogen gas in the station tube system 93 to the station ECU 95.

The station pressure sensor 97c is provided between the flow rate control valve 94b and the shut-off valve 94a of the station tube system 93 and transmits a signal associated with a pressure of hydrogen gas in the station tube system 93 to the station ECU 95.

The atmosphere temperature sensor 97d detects a temperature of the atmosphere and transmits a signal associated with a detection value to the station ECU 95. Incidentally, an atmosphere temperature that is detected by the atmosphere temperature sensor 97d can be considered as a temperature of hydrogen gas in a fuel tank of the vehicle M when filling is started, in some cases.

An infrared communication device 98 that communicates with the vehicle M is provided on the filling nozzle 92. When the filling nozzle 92 is connected to the receptacle 38, the infrared communication device 98 is a counterpart of the infrared communication device 5 provided in the vehicle M, and a data signal can be transmitted and received via an infrared between the infrared communication devices 98 and 5.

When a user executes filling with hydrogen gas by the hydrogen filling system S, the operation panel 99 is a touch panel that detects an input operation for designating a type of tank of the vehicle M by the user. For example, on the operation panel 99, there are displayed a character of "small-sized tank" meaning a hydrogen tank (for example, a tank having a volume smaller than 2.0 kg) that is mounted on a general fuel cell motorcycle, a character of "regular-sized tank" meaning a hydrogen tank (for example, a tank having a volume of 2.0 kg or larger and smaller than 10.0 kg) that is mounted on the fuel cell vehicle of a general four-wheel regular automobile, and a character of "large-sized tank" meaning a hydrogen tank (for example, a tank having a volume of 10.0 kg or larger) that is mounted on the fuel cell vehicle such as a bus. In a case where the user touches a part displayed as "small-sized tank", the operation panel 99 transmits a signal indicating that a type of tank that is designated by the user is "small-sized tank" to the station ECU 95. In addition, in a case where the user touches a part displayed as "regular-sized tank", the operation panel 99 transmits a signal indicating that a type of tank that is designated by the user is "regular-sized tank" to the station ECU 95. In addition, in a case where the user touches a part displayed as "large-sized tank", the operation panel 99 transmits a signal indicating that a type of tank that is designated by the user is "large-sized tank" to the station ECU 95.

Figure 2:
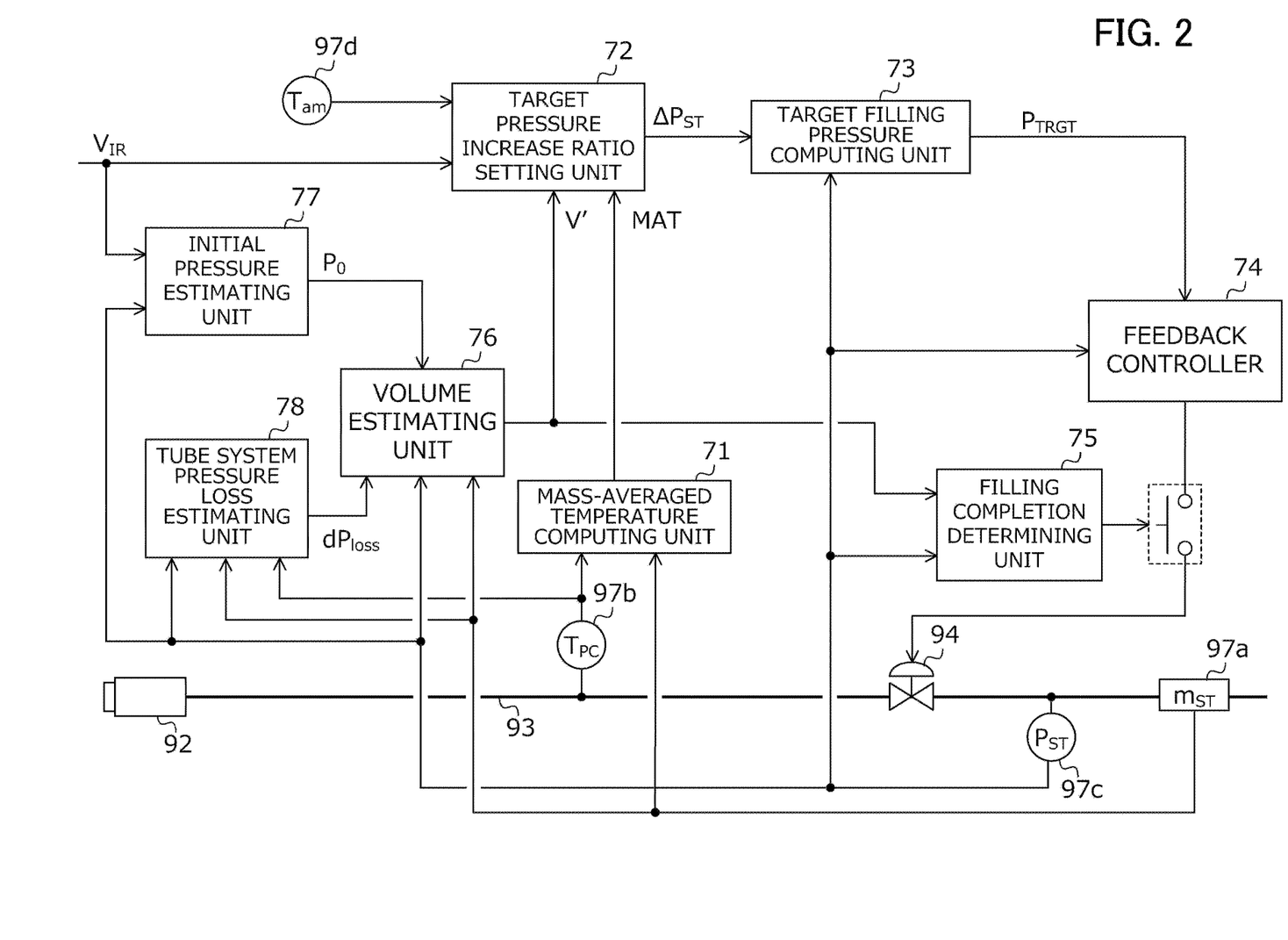
FIG. 2 is a functional block diagram illustrating a configuration of a control circuit for filling flow rate control by a station ECU.

FIG. 2 is a functional block diagram illustrating a configuration of a control circuit for filling flow rate control by the station ECU 95. A gas filling step from a start to an end of filling with hydrogen gas in the hydrogen station is divided into an initial filling step of first filling the hydrogen tank with hydrogen gas tentatively in order to know a state of the hydrogen tank of the vehicle and a main filling step of filling the hydrogen tank with hydrogen gas under filling flow rate control performed by the station ECU 95 such that a target pressure increase ratio is set and the target pressure increase ratio is realized (refer to flowcharts or the like in FIGS. 4A and 4B to be described below). FIG. 2 illustrates modules 71 to 78 that realize the filling flow rate control particularly in the main filling step.

The mass-averaged temperature computing unit 71 calculates a mass-averaged temperature MAT of hydrogen gas having passed through the pre-cooler, based on the detection value of the station temperature sensor and the detection value of the flow rate sensor. The mass-averaged temperature MAT is used to set the target pressure increase ratio in the target pressure increase ratio setting unit 72. Besides, immediately after the main filling step is started, about tens of seconds are taken for the detection value of the station temperature sensor to actually reach a temperature of gas flowing out of the pre-cooler. In this respect, the mass-averaged temperature computing unit 71 outputs, as the mass-averaged temperature MAT, a value set in advance without using the detection value of the station temperature sensor during elapse of about tens of seconds (more specifically, 30 seconds, for example) from the start of the main filling step.

The target pressure increase ratio setting unit 72 sets a target pressure increase ratio $\Delta P_{ST}$ corresponding to a target of a pressure increase ratio of the hydrogen tank in the main filling step, based on the mass-averaged temperature MAT that is calculated by the mass-averaged temperature computing unit 71. More specifically, the target pressure increase ratio setting unit 72 performs the following computations serially, thereby, setting the target pressure increase ratio $\Delta P_{ST}$.

The target pressure increase ratio setting unit 72 performs computation shown in Equation (2) to be described below, based on the mass-averaged temperature MAT and a detection value $T_{amb}$ of the atmosphere temperature sensor 97d, thereby calculating a period of filling time $t_{final}$ final corresponding to a period of time from a predetermined filling start time point $t_{ini}$ to a predetermined scheduled filling end time point.

$$t_{final} = a(T_{amb})MAT^3 + b(T_{amb})MAT^2 + C(T_{amb})MAT + d(T_{amb}) \quad (2)$$

In Equation (2) described above, values of coefficients "a", "b", "c", and "d" are calculated by retrieving a coefficient value determining map that has been selected in advance, based on the detection values $T_{amb}$ of the atmosphere temperature sensor 97d, respectively. The coefficient value determining map is a map obtained by associating an atmosphere temperature with the values of the four coefficients. In the target pressure increase ratio setting unit 72, a plurality of coefficient value determining maps are set for each volume of the hydrogen tank. In a case where an estimation value V' of the volume of the hydrogen tank is obtained by the volume estimating unit 76 to be described below, the target pressure increase ratio setting unit 72 selects a coefficient value determining map corresponding to the estimation value V' and calculates the period of filling time $t_{final}$ based on the selected coefficient value determining map.

In addition, the target pressure increase ratio setting unit 72 sets the target pressure increase ratio $\Delta P_{ST}$ such that the hydrogen tank is fully filled after the period of filling time $t_{final}$ from the filling start time point $t_{ini}$. Here, in a case where a type of hydrogen tank that is designated by a user is the small-sized tank, the target pressure increase ratio setting unit 72 sets a start time point of the initial filling step, that is, a performing time point of pre-shot filling to be described below, as the filling start time point $t_{ini}$.

The target filling pressure computing unit 73 calculates a target filling pressure $P_{TRGT}$ corresponding to a target value of a filling pressure after a predetermined period of time by using the target pressure increase ratio $\Delta P_{ST}$ set by the target pressure increase ratio setting unit 72 and a detection value $P_{ST}$ (hereinafter, also referred to as a "filling pressure") of the station pressure sensor.

The feedback controller 74 determines an instruction opening degree of the flow rate control valve such that a filling pressure $P_{ST}$ becomes the target filling pressure $P_{TRGT}$, based on the known feedback control law and inputs the instruction opening degree to a drive device (not illustrated) of the flow rate control valve. The drive device adjusts an opening degree of the flow rate control valve so as to realize the instruction opening degree. Consequently, in the main filling step, filling is performed with hydrogen gas such that the target pressure increase ratio $\Delta P_{ST}$ set by the target pressure increase ratio setting unit 72 is realized.

The filling completion determining unit 75 determines whether or not the filling with hydrogen gas is completed and sets the instruction opening degree to 0 so as to complete the filling with hydrogen gas in the case of determining that the filling is completed. For example, in the filling completion determining unit 75, the following two filling completion conditions are defined.

A first filling completion condition is that the filling pressure $P_{ST}$ exceeds a predetermined completion threshold value. The filling completion determining unit 75 determines that the hydrogen tank reaches full filling and sets the instruction opening degree to 0 so as to complete the filling with hydrogen gas in the case of determining that the filling is completed in a case where the filling pressure $P_{ST}$ detected by the pressure sensor exceeds the completion threshold value described above.

A second filling completion condition is that the instruction opening degree is set to 0 such that the filling with hydrogen gas is stopped in order to prevent overfilling in a case where the type of hydrogen tank designated by the user is the small-sized tank, and the volume estimation value V' calculated by the volume estimating unit 76 to be described below is out of a predetermined range.

The initial pressure estimating unit 77 estimates an initial tank pressure which is a pressure of the hydrogen tank before the initial filling step is started, that is, immediately before the hydrogen tank starts to be filled with hydrogen gas from the hydrogen station. More specifically, after pre-shot filling to be described below, which is included in the initial filling step, is performed, the initial pressure estimating unit 77 calculates an estimation value $\rho_{0\ real}$ of initial tank density from Equation (3) to be described below by using a pressure in the station tube system detected by the station pressure sensor, the volume of the hydrogen tank, or the like. Further, the initial pressure estimating unit inputs the estimation value $\rho_{0\ real}$ of the initial tank density into a state equation of gas, thereby, calculating an estimation value $P_0$ of the initial tank pressure.

$$\rho_{0\ real} = \rho'_0 - \left(\frac{V_{PRE}}{V}\right)(\rho_{pre} - \rho'_{pre}) \quad (3)$$

Equation (3) described above is derived from a principle of conservation of mass that is established before and after the pre-shot filling. In Equation (3) described above, "$V_{PRE}$" represents a volume in a storage zone (more specifically, a zone from the shut-off valve to the flow rate control valve in the station tube system) in which pressure increases temporarily during the pre-shot filling, and a predetermined value is used as $V_{PRE}$. In Equation (3) described above, "$P_{pre}$" represents gas density in the storage zone before the pre-shot filling, a value calculated by retrieving a predetermined map based on a pressure and a temperature of a gas in the storage zone before the pre-shot filling is used as $\rho_{pre}$, for example. In Equation (3) described above, "$\rho'_{pre}$" represents gas density in the storage zone after the pre-shot filling, a value calculated by retrieving a predetermined map based on a pressure and a temperature of a gas in the storage zone after the pre-shot filling is used as $\rho'_{pre}$, for example. In Equation (3) described above, "$\rho'_0$" represents gas density in the hydrogen tank after the pre-shot filing, and the same value as "$\rho'pre$" is used as $\rho'_0$, for example. In addition, "V" is the volume of the hydrogen tank, the volume transmission value $V_{IR}$ is used in a case where it is possible to acquire the volume transmission value $V_{IR}$ that is transmitted from the vehicle side. In addition, in a case where the type of hydrogen tank that is designated by the user is the small-sized tank, and it is not possible to acquire the volume transmission value $V_{IR}$, a predetermined value which is a volume value of a general small-sized tank is used as "V" in Equation (3) described above.

When hydrogen gas that flows out from the pressure accumulator flows in the station tube system and the vehicle tube system and flows into the hydrogen tank, the tube system pressure loss estimating unit 78 calculates a pressure loss value corresponding to an estimation value of a pressure loss occurring in the station tube system and the vehicle tube system (hereinafter, also collectively referred to as a "connection tube system").

Figure 3:
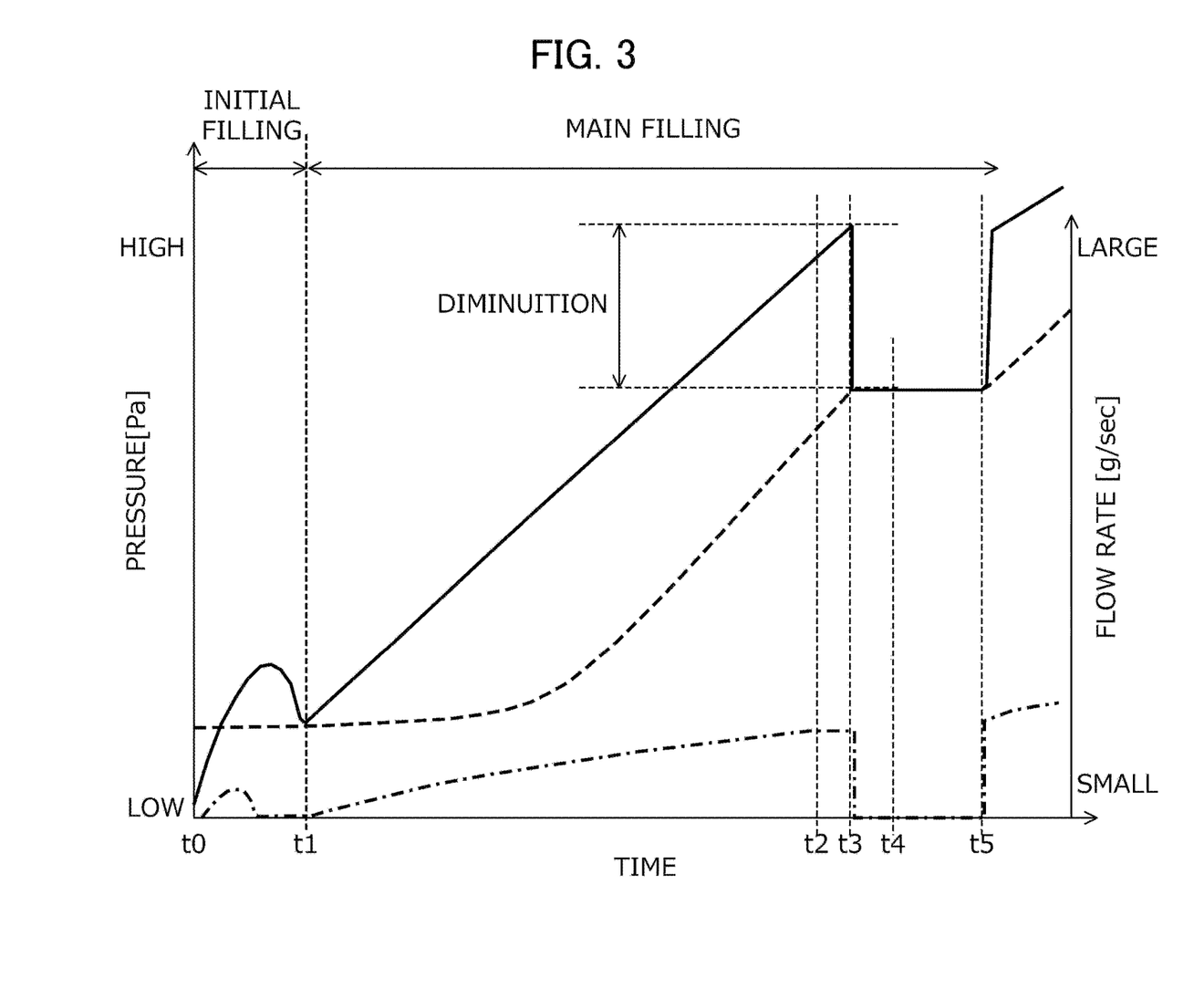
FIG. 3 is a time chart for illustrating a procedure of calculating a pressure loss value in a connection tube system by a tube system pressure loss estimating unit.

FIG. 3 is a time chart for illustrating a procedure of calculating the pressure loss value in the connection tube system by the tube system pressure loss estimating unit 78. More specifically, FIG. 3 illustrates a change in pressure and flow rate during the initial filling step and the main filling step. In FIG. 3, a solid line represents a temporal change in pressure detected by the station pressure sensor, a dashed line represents a temporal change in pressure in the hydrogen tank, and a dot-and-dash line represents a temporal change in flow rate detected by the flow rate sensor. In addition, FIG. 3 illustrates a case where the main filling step is executed after a time point t1, after the initial filling step (pre-shot filling) is executed between a time point t0 and the time point t1. In particular, a case where filling is temporarily stopped so as to perform a leak checking process is illustrated between time points t3 and t5, for example.

In FIG. 3, when main filling is performed from the time point t1 to the time point t3, hydrogen gas flows from the pressure accumulator side to the hydrogen tank side, and thus a flow rate detected by the flow rate sensor increases as illustrated in FIG. 3. In addition, the pressure in the connection tube system also increases due to the filling, and thus pressure detected by the station pressure sensor also increases from the time point t1 to the time point t3. In addition, hydrogen gas flows into the hydrogen tank due to the filling, the pressure in the hydrogen tank also gently increases from the time point t1 to the time point t3. In this case, while hydrogen gas flows in the connection tube system, a significant pressure loss occurs depending on a structure of a flow channel in the connection tube system, and thus the pressure in the hydrogen tank is lower than the pressure detected by the station pressure sensor, as illustrated in FIG. 3.

In addition, when the main filling is temporarily stopped due to any reasons at the time point t3, hydrogen gas does not flow, and thus the flow rate detected by the flow rate sensor immediately becomes 0, as illustrated in FIG. 3. In addition, hydrogen gas does not flow at the time point t3 as described above, and thus the pressure loss in the connection tube system becomes 0. Hence, the pressure detected by the station pressure sensor rapidly decreases and becomes substantially equal to the pressure in the hydrogen tank. In other words, a diminution in pressure detected by the station pressure sensor at the time point t3 is substantially equal to a pressure loss $dP_{loss}$ that occurs in the connection tube system during the main filling. Here, Equation (4) to be described below is a theoretical expression of the pressure loss $dP_{loss}$.

$$dP_{loss} = k_0 \frac{dm^2}{\rho} \qquad (4)$$

In Equation (4) described above, "dm" represents a mass flow rate of hydrogen gas that flows in the connection tube system, and a detection value of the flow rate sensor is used as dm, for example. In addition, "$\rho$" represents density of hydrogen gas, and a value calculated by inputting the detection value of the station pressure sensor in the known function and the detection value of the station temperature sensor is used as $\rho$, for example. In addition, "$k_0$" is a coefficient related to the pressure loss occurring in the connection tube system and will be referred to as a shape factor coefficient, hereinafter. The shape factor coefficient $k_0$ is a coefficient that is determined, depending on a shape of a flow channel of hydrogen gas, which is formed mainly in the connection tube system. The tube system pressure loss estimating unit 78 determines a value of the shape factor coefficient $k_0$ described above by using any opportunity of temporarily stopping the filling during the main filling step and estimates the pressure loss $dP_{loss}$ at any time point based on Equation (4) described above, by using the determined shape factor coefficient $k_0$, the detection value of the flow rate sensor, and an estimation value of the density of hydrogen gas.

Here, the opportunity of temporarily stopping the filling during the main filling step can be gained during execution of the leak checking process in a case where the leak checking process is obliged by law to be executed during the main filling step, for example.

In addition, even in a case where the leak checking process is obliged by law to be executed during the main filling step, filling is temporarily stopped to perform replacement of the hydrogen tank on the station side during the main filling step in some cases, for example, and thus it is possible to gain opportunity during execution of such tank replacement. In addition, the elapse of tens of seconds (for example, 30 seconds) from the start of the main filling step is set as a period in which temperatures of the pre-cooler and the station tube system become equal to each other. During the period filling is performed under a constant pressure increase ratio, and then filling is performed under a variable pressure increase ratio in some cases. Hence, in a case where the tank replacement is not performed as described above, the filling may be temporarily stopped at a timing at which a filling control method is switched depending on the elapse of tens of seconds from the start of the main filling step as described above, and the shape factor coefficient $k_0$ may be estimated as described above.

Incidentally, in a case where there is no opportunity of temporarily stopping the filling during the main filling step as described above, a predetermined value obtained by performing a preliminary test or the like or a value acquired by such an algorithm described above when the previous main filling step is ended may be used as the shape factor coefficient $k_0$.

Here, the tube system pressure loss estimating unit 78 calculates a value of the shape factor coefficient $k_0$ based on Equation (5-1) to be described below derived from Equation (4) described above. In Equation (5-1) to be described below, "$\Delta P_{PRE}$" is the diminution of the pressure in the connection tube system when the main filling is temporarily stopped at the time point t3, as illustrated in FIG. 3, and is calculated by using the detection value of the station pressure sensor before and after the main filling is temporarily stopped, for example. In addition, "$dm_{PRE}$" is a mass flow rate of hydrogen gas that flows in the connection tube system during the main filling (before the filling is temporarily stopped), and the detection value of the flow rate sensor at the time point t2 immediately before the time point t3 is used as $dm_{PRE}$. In addition, "$P_{PRE}$" is density of hydrogen gas in the connection tube system during the main filling (before the filling is temporarily stopped), and a value calculated by inputting, in the known density function p, an average value of a detection value P (t2) of the station pressure sensor at the time point t2 immediately before the time point t3 and a detection value P (t4) of the station pressure sensor at the time point t4 immediately after the time point t3 may be used as $\rho_{PRE}$ and a detection value T of the station temperature sensor at the time point t3, as shown in Equation (5-2) to be described below.

$$k_0 = \frac{\Delta P_{PRE} \rho_{PRE}}{dm_{PRE}^2} \quad (5\text{-}1)$$

$$\rho_{PRE} = \rho\left(\frac{P(t1) + P(t3)}{2}, T\right) \quad (5\text{-}2)$$

Returning to FIG. 2, the volume estimating unit 76 estimates the volume of the hydrogen tank that is connected to the hydrogen station. More specifically, the volume estimating unit 76 performs computation shown in Equation (6) to be described below based on the detection value of the flow rate sensor, the detection value of the station pressure sensor, the predetermined volume value of the connection tube system, and the pressure loss value calculated by the tube system pressure loss estimating unit 78, thereby, calculating the estimation value V' of the volume of the hydrogen tank. As will be described below, Equation (6) to be described below is derived, based on a real gas equation established at any time point $t_1$ during the filling with hydrogen gas.

$$V' = \left[\frac{(\Delta M + \rho_0 V_{tube}) z_1 R\ T_1}{P1} - V_{tube}\right] \Big/ \left[1 - \frac{\rho_0 z_1 R\ T_1}{P1}\right] \quad (6)$$

In Equation (6) described above, "$\Delta M$" represents a mass of hydrogen gas passing through the connection tube system from an estimation time point $t_0$ of the initial pressure by the initial pressure estimating unit 77 to the time point $t_1$, and a value obtained by integrating detection values of the flow rate sensor is used as $\Delta M$, for example.

"$V_{tube}$" represents a volume value of the connection tube system, and a predetermined value is used as $V_{tube}$. As described above, the connection tube system has a configuration in which the station tube system of which the volume value is known is connected with the vehicle tube system of which the volume value is not known. However, in the entire connection tube system, a proportion of the vehicle tube system is small, and thus the volume value of the station tube system is used as "$V_{tube}$" described above. In Equation (6) described above, "$T_1$" represents a temperature of hydrogen gas in the hydrogen tank at the time point $t_1$, and the detection value of the atmosphere temperature sensor is used as $T_1$, for example. In Equation (6) described above, "R" represents a gas constant, and a predetermined value is used as R.

In Equation (6) described above, "$P_1$" represents a pressure in the hydrogen tank at the time point $t_1$, and a value thereof is calculated in accordance with Equation (7) to be described below. In Equation (7) to be described below, "$P_{st}$" represents a pressure in the connection tube system at the time point $t_1$, and the detection value of the station pressure sensor at the time point $t_1$ is used as $P_{st}$, for example. In addition, "$dP_{loss\ est}$" represents a pressure loss occurring in the connection tube system from the time point $t_0$ to the time point $t_1$, and the pressure loss value calculated by the tube system pressure loss estimating unit 78 from the time point $t_0$ to the time point $t_1$ is used as $dP_{loss\ est}$.

$$P_1 = P_{st} - dP_{loss\ est} \quad (7)$$

In Equation (6) described above, "$z_1$" represents a compression coefficient of hydrogen gas in the hydrogen tank at the time point $t_1$. As a value of the compression coefficient $z_1$, for example, a value calculated by inputting "$T_1$", which is the temperature of hydrogen gas in the hydrogen tank at the time point $t_1$, and "$P_1$", which is the pressure in the hydrogen tank at the time point $t_1$, in the known function f as will be shown in Equation (8) to be described below, is used.

$$z_1 = f(T_1, P_1) \quad (8)$$

In Equation (6) described above, "$\rho_0$" is density of hydrogen gas in the hydrogen tank at the time point $t_0$. A value calculated by inputting an initial pressure $P_0$ calculated by the initial pressure estimating unit 77 and the temperature $T_0$ of hydrogen gas in the hydrogen tank at the time point $t_0$ in the known density function p, as will be shown in Equation (9) to be described below, is used. Incidentally, the detection value of the atmosphere temperature sensor is used as the temperature $T_0$ of hydrogen gas in the hydrogen tank at the time point $t_0$.

$$\rho_0 = \rho(P_0, T_0) \quad (9)$$

Incidentally, Equation (6) described above for estimating the tank volume is derived by using approximate equations shown as Equations (10-2) and (10-3) to be described below in a state equation (refer to Equation (10-1) to be described below) that is established at any time point $t_1$.

$$P_1 V_{tank} = z_1 M_1 R T_1 \quad (10\text{-}1)$$

$$M_1 \cong M_0 + \frac{V_{tank}}{V_{tank} + V_{tube}} \Delta M \quad (10\text{-}2)$$

$$M_0 = \rho_0 V_{tank} \quad (10\text{-}3)$$

Figure 4A:
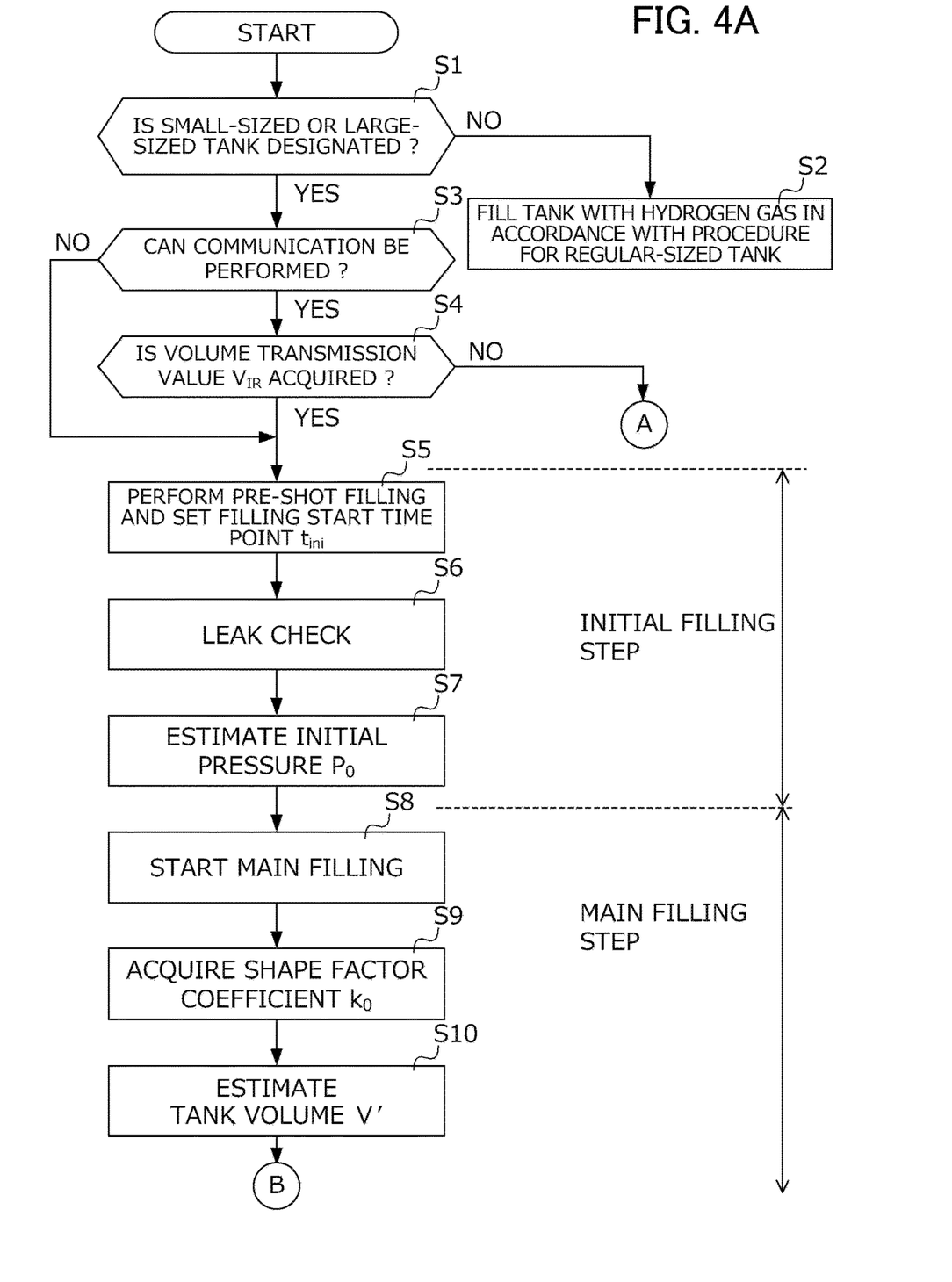
FIG. 4A is a flowchart illustrating a procedure of filling with hydrogen gas by the hydrogen filling system.
Figure 4B:
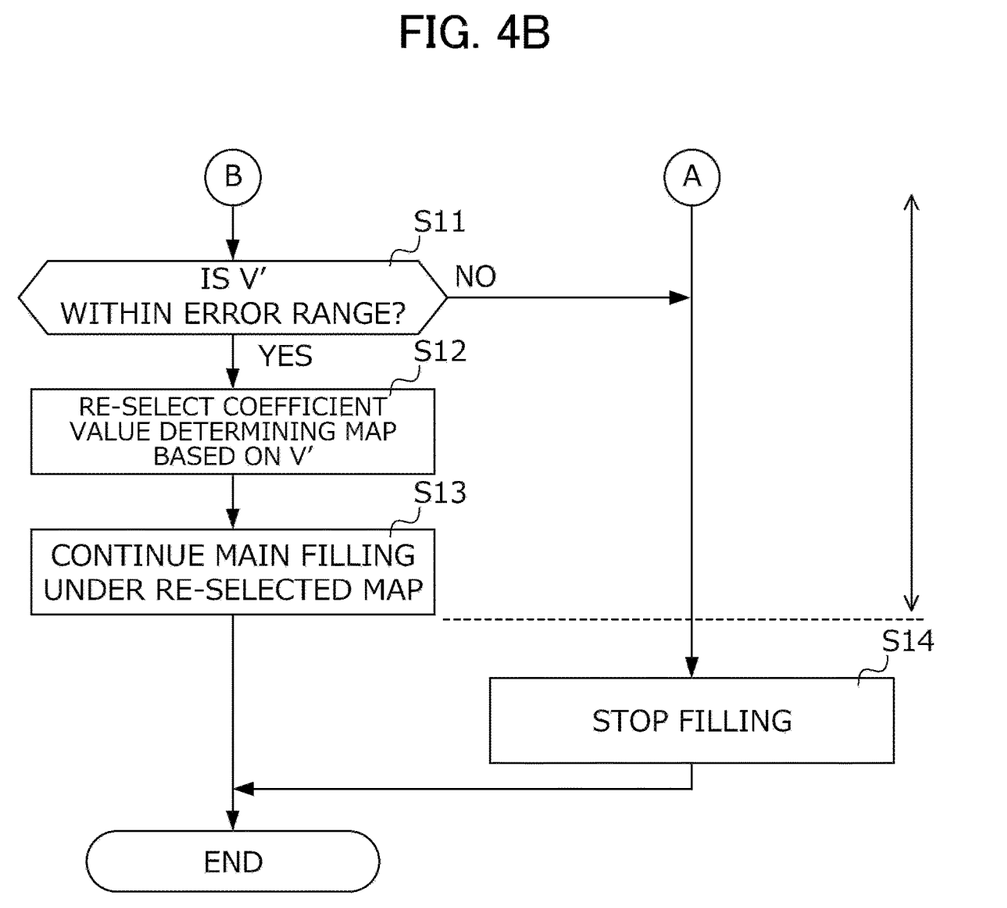
FIG. 4B is a flowchart illustrating a procedure of filling with the hydrogen gas by the hydrogen filling system.

Next, a specific procedure of filling the tank with hydrogen gas in the hydrogen filling system will be described. FIGS. 4A and 4B are flowcharts illustrating a procedure of filling the tank with hydrogen gas by the hydrogen filling system. This process is started as the filling nozzle of the hydrogen station is connected with the receptacle of the vehicle, and the filling with hydrogen gas becomes possible. As illustrated in FIGS. 4A and 4B, a step from the start to the end of the filling with the hydrogen gas is divided into the initial filling step (refer to S5 to S7) of tentatively filling the hydrogen tank with hydrogen gas and the main filling step (refer to S8 to S13) of filling the hydrogen tank with hydrogen gas under the predetermined target pressure increase ratio.

In S1, the station ECU discriminates whether or not the type of hydrogen tank that is designated by the user is the small-sized tank or the large-sized tank. In a case where the discrimination in S1 is NO, that is, a case where the designated type of hydrogen tank is a regular-sized tank, the station ECU performs the filling with hydrogen gas in accordance with the algorithm that is defined for the regular-sized tank (refer to S2). Incidentally, a filling procedure of hydrogen gas for the regular-sized tank is described in detail in PCT International Publication No. WO2017/159314 by the applicant of the present application, and thus the detailed description thereof is omitted.

In a case where the discrimination in S1 is YES, the station ECU discriminates whether or not the currently connected vehicle is communicable (refer to S3). In a case where the discrimination in S3 is YES, the station ECU discriminates whether or not the volume transmission value $V_{IR}$ that is transmitted from the vehicle can be received (refer to S4). In a case where the discrimination in S4 is YES, the station ECU proceeds to S5. In a case where the discrimination in S4 is NO, the station ECU stops the filling (refer to S13). In addition, in a case where the discrimination in S3 is NO, the station ECU proceeds to S5.

In S5, the station ECU executes the pre-shot filling. More specifically, while the flow rate control valve provided on the station tube system is closed, the shut-off valve provided upstream side of the flow rate control valve is opened, and the pressure in the station tube system is increased until the detection value of the station pressure sensor provided upstream side of the flow rate control valve. Then, the shut-off valve is closed. Consequently, a storage zone from the flow rate control valve to the shut-off valve in the station tube system is filled with an amount of hydrogen gas corresponding to the pressure. Next, while the shut-off valve is closed, the flow rate control valve is opened. Consequently, hydrogen gas compressed in the storage zone described above flows into the hydrogen tank at once, and the insides of the hydrogen tank and the station tube system are uniformized. In addition, in S5, the pre-shot filling is executed as described above, and a time point, at which the pre-shot filling is started, is set as the filling start time point $t_{ini}$ that is needed when the period of filling time $t_{final}$ is determined by the above-described target pressure increase ratio setting unit.

In S6, the station ECU temporarily stops the filling with hydrogen gas and executes the leak check of checking filling leak.

In S7, the initial pressure estimating unit of the station ECU performs computation shown in Equation (3) described above, thereby, calculating the estimation value $P_0$ of a tank initial pressure which is the pressure in the hydrogen tank immediately before the pre-shot filling is started.

In S8, the station ECU starts the main filling. In other words, in and after S8, filling with hydrogen gas is performed such that the target pressure increase ratio determined in the target pressure increase ratio setting unit is realized. Incidentally, it is not possible to use the detection value of the station temperature sensor as described above during the elapse of tens of seconds (for example, 30 seconds) from the start of the main filling in S8. Therefore, during the elapse of 30 seconds from the start of the filling, the target pressure increase ratio setting unit retrieves the coefficient value determining map based on the predetermined mass-averaged temperature MAT, thereby, determining the period of filling time $t_{final}$. In addition, in S8, the volume of the hydrogen tank is not fixed at the start of the main filling. Therefore, the target pressure increase ratio setting unit selects the coefficient value determining map depending on the volume value obtained via communication. In addition, in a case where the volume value is not obtained via communication, a map determined to have slowest filling speed is selected from a plurality of coefficient determining maps set in advance.

In S9, the tube system pressure loss estimating unit of the station ECU acquires a value of the shape factor coefficient $k_0$ which is needed when the pressure loss value is calculated at any time point. As described above, in the case of using a predetermined value as a value of the shape factor coefficient $k_0$, the tube system pressure loss estimating unit reads a value stored in a memory not illustrated, thereby, acquiring the value of the shape factor coefficient $k_0$. In addition, in a case where it is possible to ensure an opportunity of temporarily stopping the filling during the main filling, the tube system pressure loss estimating unit temporarily stops the filling with hydrogen gas and calculates the value of the shape factor coefficient $k_0$ by using a period in which the filling with hydrogen gas is temporarily stopped.

In S10, the volume estimating unit of the station ECU estimates the volume of the connected hydrogen tank. More specifically, the volume estimating unit performs computation shown in Equation (6) described above based on the detection value of the flow rate sensor or the station pressure sensor at any two time points $t_0$ and $t_1$ during the elapse of 30 seconds after the start of the main filling from the start of the pre-shot filling, thereby, calculating the estimation value V' of the volume of the hydrogen tank.

In S11, the filling completion determining unit of the station ECU discriminates whether or not the calculated estimation value V' of the tank volume is within a predetermined error range. Here, in a case where the volume transmission value $V_{IR}$ is acquired, the error range is set in a range $[V_{IR}-\Delta, V_{IR}+\Delta]$ with a value, which is obtained by subtracting an allowable error $\Delta$ from the volume transmission value $V_{IR}$, as a lower limit and a value, which is obtained by adding the allowable error $\Delta$ to the volume transmission value as an upper limit. In addition, in a case where the volume transmission value $V_{IR}$ is not acquired, the error range is set to a predetermined range so as to include the volume of a general small-sized tank.

In a case where the discrimination in S11 is NO, the station ECU stops the filling (refer to S14). In addition, in a case where the discrimination in S11 is YES, the target pressure increase ratio setting unit of the station ECU re-selects the coefficient value determining map based on the acquired estimation value V' of the tank volume (refer to S12).

In S13, the station ECU continues the main filling under the coefficient value determining map that is re-selected in S12, in association with the elapse of 30 seconds from the start of the main filling in S8.

Figure 5:
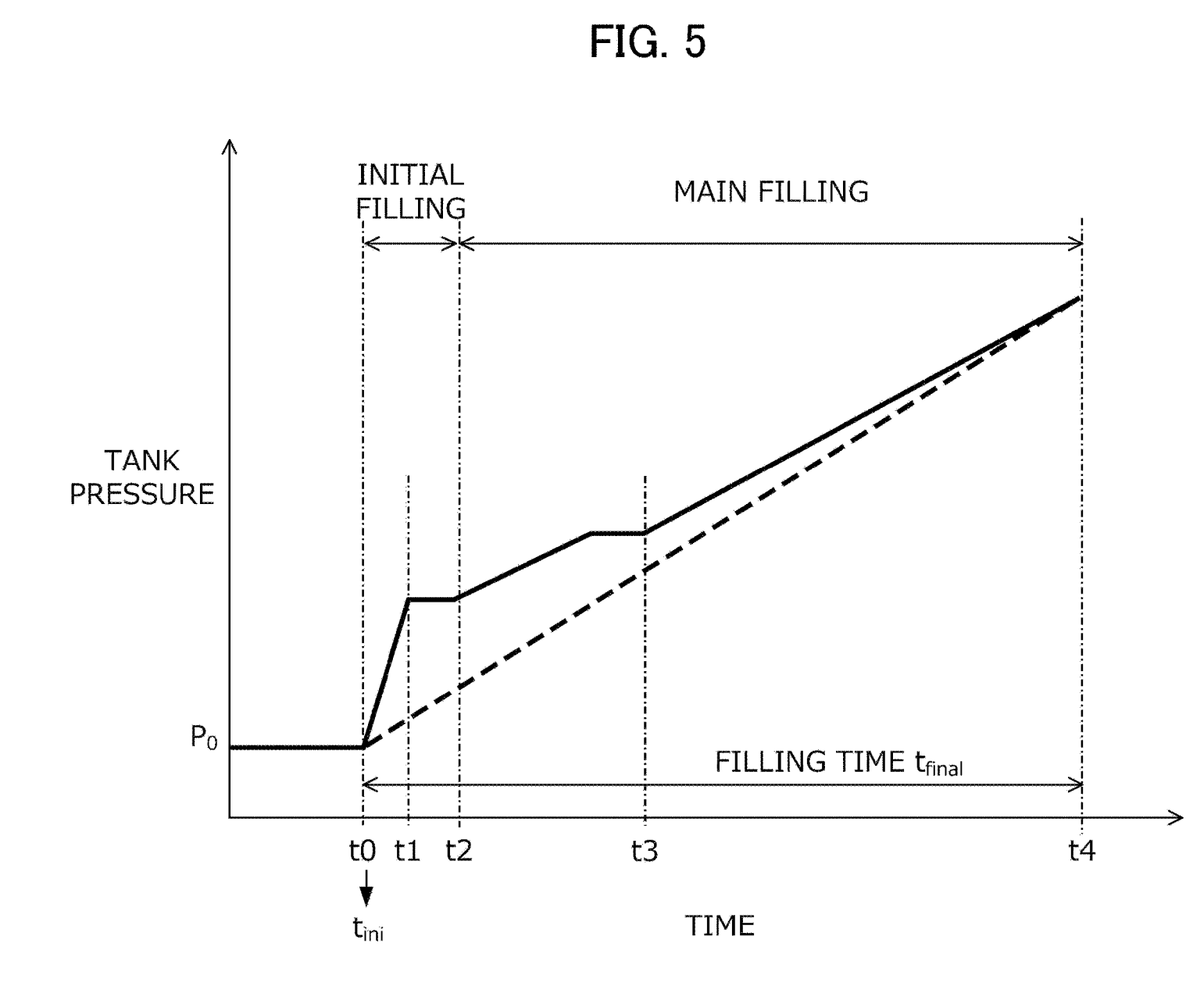
FIG. 5 is a time chart schematically illustrating a flow of filling with the hydrogen gas, which is realized by the flowchart in FIGS. 4A and 4B.

FIG. 5 is a time chart schematically illustrating a flow of the filling with the hydrogen gas, which is realized by the flowchart in FIGS. 4A and 4B. In FIG. 5, a solid line represents a change in pressure in the hydrogen tank.

First, the hydrogen station executes the pre-shot filling (refer to S5 in FIG. 4A) from the time point t0 to the time point t1 and sets the time point t0, at which the pre-shot filling is started, as the filling start time point $t_{ini}$.

Next, the hydrogen station executes the leak check from the time point t1 to the time point t2 (refer to S6 in FIG. 4A). In addition, the hydrogen station executes the leak check from the time point t1 to the time point t2, thereby, calculating the shape factor coefficient $k_0$ that is needed to estimate the pressure loss value at any time point by using a period during which the filling with hydrogen gas is stopped (refer to S9 in FIG. 4A), and estimating the initial pressure $P_0$ of the hydrogen tank (refer to S7 in FIG. 4A).

Next, the hydrogen station starts the main filling at the time point t2 (refer to S8 in FIG. 4A). Incidentally, the target pressure increase ratio setting unit performs the filling under a constant target pressure increase ratio based on the fixed mass-averaged temperature MAT during the elapse of tens of seconds from the start of the main filling at the time point t2. In addition, after the main filling is started at the time point t2, the hydrogen station estimates the volume of the hydrogen tank (refer to S10 in FIG. 4A) and further re-selects the coefficient value determining map by using the estimated volume (refer to S12 in FIG. 4B).

Next, the hydrogen station sets the target pressure increase ratio under the coefficient value determining map re-selected as described above, in association with the elapse of tens of seconds from the start of the main filling at the time point t3, and the filling with hydrogen gas is performed to realize the target pressure increase ratio. Here, the target pressure increase ratio setting unit retrieves the coefficient value determining map based on the mass-averaged temperature MAT, thereby, calculating the period of filling time $t_{final}$ and sets the target pressure increase ratio such that the hydrogen tank is fully filled at the time point t4 after the period of filling time $t_{final}$ elapses from the filling start time point $t_{ini}$ set to the time point t0 as described above.

As described above, the embodiment of the invention is described; however the invention is not limited thereto. The detailed configurations may be appropriately modified within a range of the gist of the invention.

EXPLANATION OF REFERENCE NUMERALS

S Hydrogen filling system (Gas filling system)
M Vehicle (Moving object)
31 Hydrogen tank (Tank)
39 Vehicle tube system (Tube system)
72 Target pressure increase ratio setting unit
76 Volume estimating unit
77 Initial pressure estimating unit
78 Tube system pressure loss estimating unit
9 Hydrogen station (Gas supply device)
91 Pressure accumulator (Supply source)
93 Station tube system (Tube system)
95 Station ECU
97a Flow rate sensor
97c Station pressure sensor (Pressure sensor)
99 Operation panel (Input device)

What is claimed is:

1. A gas filling method of filling a tank with a gas from a supply source by a gas filling system including a gas supply device having the supply source of a compressed gas, a moving object having the tank that contains the gas, a tube system that connects the supply source and the tank, and a flow rate sensor and a pressure sensor provided on the tube system, the gas filling method comprising:
    estimating a tank volume, which is a volume of the tank, based on detection values of the flow rate sensor and the pressure sensor and a volume value of the tube system, after a start of filling of the tank with the gas from the supply source.

2. The gas filling method according to claim 1, further comprising:
    calculating a value of a coefficient related to a pressure loss, which occurs when the gas flows in the tube system, based on the detection values of the flow rate sensor and the pressure sensor when filling of the tank with the gas from the supply source is stopped,
    wherein the tank volume is estimated based on the detection values of the flow rate sensor and the pressure sensor, the volume value of the tube system, and a pressure loss value calculated based on the value of the coefficient.

3. The gas filling method according to claim 1,
    wherein a term of filling the tank with the gas is divided into an initial filling term of filling the tank with the gas in order to know a state of the tank and a main filling term of filling the tank with the gas so as to realize a predetermined target pressure increase ratio, and
    wherein the tank volume is estimated based on the detection values of the flow rate sensor and the pressure sensor, during the main filling term.

4. The gas filling method according to claim 2,
    wherein a term of filling the tank with the gas is divided into an initial filling term of filling the tank with the gas in order to know a state of the tank and a main filling term of filling the tank with the gas so as to realize a predetermined target pressure increase ratio, and
    wherein the tank volume is estimated based on the detection values of the flow rate sensor and the pressure sensor, during the main filling term.

5. The gas filling method according to claim 3, further comprising:
    estimating an initial pressure of the tank before a start of the initial filling term based on the detection value of the pressure sensor, after the initial filling term is started,
    wherein, in the main filling term, the filling of the gas is started immediately after the initial pressure is estimated, and the filling of the gas is performed so as to realize a target pressure increase ratio set based on an estimation value of the initial pressure estimated in the initial filling term.

6. The gas filling method according to claim 4, further comprising:
    estimating an initial pressure of the tank before a start of the initial filling term based on the detection value of the pressure sensor, after the initial filling term is started,
    wherein, in the main filling term, the filling of the gas is started immediately after the initial pressure is estimated, and the filling of the gas is performed so as to realize a target pressure increase ratio set based on an estimation value of the initial pressure estimated in the initial filling term.

7. The gas filling method according to claim 1,
    wherein, when an estimation value of the tank volume estimated after the start of filling of the tank with the gas from the supply source is out of a predetermined range, the filling of the tank with the gas from the supply source is stopped.

8. The gas filling method according to claim 2,
    wherein, when an estimation value of the tank volume estimated after the start of filling of the tank with the gas from the supply source is out of a predetermined range, the filling of the tank with the gas from the supply source is stopped.

9. The gas filling method according to claim 3,
    wherein, when an estimation value of the tank volume estimated after the start of filling of the tank with the gas from the supply source is out of a predetermined range, the filling of the tank with the gas from the supply source is stopped.

10. The gas filling method according to claim 6,
wherein, when an estimation value of the tank volume estimated after the start of filling of the tank with the gas from the supply source is out of a predetermined range, the filling of the tank with the gas from the supply source is stopped.

11. The gas filling method according to claim 3,
wherein the gas filling system includes an input device that receives an operation performed by a user to designate a type of tank,
wherein the gas filling method further comprises determining whether or not a type of tank designated via the input device is a small-sized tank having a volume smaller than a predetermined standard volume or a large-sized tank having a volume larger than the standard volume, and
wherein, in the main filling term, a period of filling time corresponding to a period of time from a predetermined filling start time point to a scheduled filling end time point, is calculated based on the detection values of the pressure sensor and the flow rate sensor during the filling of the gas, the target pressure increase ratio is determined such that the tank is fully filled at the scheduled filling end time point based on the period of filling time, and the filling start time point is set to a start time point of the initial filling term when a type of tank is determined as a small-sized tank.

12. The gas filling method according to claim 6,
wherein the gas filling system includes an input device that receives an operation performed by a user to designate a type of tank,
wherein the gas filling method further comprises determining whether or not a type of tank designated via the input device is a small-sized tank having a volume smaller than a predetermined standard volume or a large-sized tank having a volume larger than the standard volume, and
wherein, in the main filling term, a period of filling time corresponding to a period of time from a predetermined filling start time point to a scheduled filling end time point, is calculated based on the detection values of the pressure sensor and the flow rate sensor during the filling of the gas, the target pressure increase ratio is determined such that the tank is fully filled at the scheduled filling end time point based on the period of filling time, and the filling start time point is set to a start time point of the initial filling term when a type of tank is determined as a small-sized tank.

13. The gas filling method according to claim 1,
wherein an estimation value V' of the tank volume is calculated based on Equation (1) to be described below, $$V' = \left[\frac{(\Delta M + \rho_0 V_{tube})z_1 R\ T_1}{P1} - V_{tube}\right] \Big/ \left[1 - \frac{\rho_0 z_1 R\ T_1}{P1}\right] \quad (1)$$

In Equation (1), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

14. The gas filling method according to claim 2,
wherein an estimation value V' of the tank volume is calculated based on Equation (2) to be described below, $$V' = \left[\frac{(\Delta M + \rho_0 V_{tube})z_1 R\ T_1}{P1} - V_{tube}\right] \Big/ \left[1 - \frac{\rho_0 z_1 R\ T_1}{P1}\right] \quad (2)$$

In Equation (2), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

15. The gas filling method according to claim 3,
wherein an estimation value V' of the tank volume is calculated based on Equation (3) to be described below, $$V' = \left[\frac{(\Delta M + \rho_0 V_{tube})z_1 R\ T_1}{P1} - V_{tube}\right] \Big/ \left[1 - \frac{\rho_0 z_1 R\ T_1}{P1}\right] \quad (3)$$

In Equation (3), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

16. The gas filling method according to claim 5,
wherein an estimation value V' of the tank volume is calculated based on Equation (4) to be described below, $$V' = \left[\frac{(\Delta M + \rho_0 V_{tube})z_1 R\ T_1}{P1} - V_{tube}\right] \Big/ \left[1 - \frac{\rho_0 z_1 R\ T_1}{P1}\right] \quad (4)$$

In Equation (4), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

17. The gas filling method according to claim 7,
wherein an estimation value V' of the tank volume is calculated based on Equation (5) to be described below, $$V' = \left[\frac{(\Delta M + \rho_0 V_{tube})z_1 R\ T_1}{P1} - V_{tube}\right] \Big/ \left[1 - \frac{\rho_0 z_1 R\ T_1}{P1}\right] \quad (5)$$

In Equation (5), "$\Delta M$" represents a mass of a gas passing through the tube system between any two time points $t_0$ and $t_1$ after the start of the filling of the gas, "$V_{tube}$"

represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

18. The gas filling method according to claim 10, wherein an estimation value V' of the tank volume is calculated based on Equation (6) to be described below, $$V' = \left[\frac{(\Delta M + \rho_0 V_{tube})z_1 R\, T_1}{P1} - V_{tube}\right] \Big/ \left[1 - \frac{\rho_0 z_1 R\, T_1}{P1}\right] \qquad (6)$$

In Equation (6), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

19. The gas filling method according to claim 11, wherein an estimation value V' of the tank volume is calculated based on Equation (7) to be described below, $$V' = \left[\frac{(\Delta M + \rho_0 V_{tube})z_1 R\, T_1}{P1} - V_{tube}\right] \Big/ \left[1 - \frac{\rho_0 z_1 R\, T_1}{P1}\right] \qquad (7)$$

In Equation (7), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

20. The gas filling method according to claim 12, wherein an estimation value V' of the tank volume is calculated based on Equation (8) to be described below, $$V' = \left[\frac{(\Delta M + \rho_0 V_{tube})z_1 R\, T_1}{P1} - V_{tube}\right] \Big/ \left[1 - \frac{\rho_0 z_1 R\, T_1}{P1}\right] \qquad (8)$$

In Equation (8), "$\Delta M$" represents a mass of a gas passing through the tube system between any two time points $t_0$ and $t_1$ after the start of the filling of the gas, "$V_{tube}$" represents a volume value of the tube system, "R" represents a gas constant, "$T_1$" represents a temperature of the gas in the tank at the time point $t_1$, "$P_1$" represents a pressure in the tank at the time point $t_1$, "$z_1$" represents a coefficient of compressibility of the gas in the tank at the time point $t_1$, and "$\rho_0$" represents density of the gas in the tank at the time point $t_0$.

* * * * *